US010286863B2

(12) United States Patent
Schulz

(10) Patent No.: US 10,286,863 B2
(45) Date of Patent: May 14, 2019

(54) MOTOR VEHICLE AND FASTENING DEVICE FOR A MOTOR VEHICLE

(71) Applicant: AUDI AG, Ingolstadt (DE)

(72) Inventor: Markus Schulz, Gaimersheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/677,681

(22) Filed: Aug. 15, 2017

(65) Prior Publication Data

US 2018/0056905 A1 Mar. 1, 2018

(30) Foreign Application Priority Data

Aug. 26, 2016 (DE) .......................... 10 2016 010 356

(51) Int. Cl.
*B60R 19/24* (2006.01)
*B60R 19/34* (2006.01)
*B60R 19/18* (2006.01)

(52) U.S. Cl.
CPC .............. *B60R 19/18* (2013.01); *B60R 19/34* (2013.01); *B60R 2019/1886* (2013.01)

(58) Field of Classification Search
CPC ......... B60R 19/18; B60R 19/34; B60R 19/24; B60R 2019/1886; B60R 2019/262
USPC ................................. 293/133, 132, 120, 121
See application file for complete search history.

(56) References Cited

U.S. PATENT DOCUMENTS 7,478,849 B2 * 1/2009 Fortin ..................... B60R 19/18
293/120

FOREIGN PATENT DOCUMENTS

| DE | 10 2006 039 685 A1 | 2/2008 |
| DE | 10 2008 059 845 | 11/2009 |
| EP | 0 343 546 | 11/1989 |
| EP | 1 878 621 | 1/2008 |

OTHER PUBLICATIONS

European Search Report dated Dec. 5, 2017 with respect to counterpart European patent application EP 17 00 0833.
Translation of European Search Report dated Dec. 5, 2017 with respect to counterpart European patent application EP 17 00 0833.

* cited by examiner

*Primary Examiner* — Dennis H Pedder
(74) *Attorney, Agent, or Firm* — Henry M. Feiereisen LLC

(57) ABSTRACT

A motor vehicle includes a vehicle body, a bumper cover, and a fastening device for attaching the bumper cover to the vehicle body. The fastening device has a triangular shape and includes a restraining member, a fastener configured to secure the restraining member to the vehicle body, and a pivot member articulated to the restraining member for swinging about a pivot. The pivot member has a pivot-distal end which is supported on the restraining member via a support member which is angled in relation to the pivot member. The support member is configured to undergo a deformation, when a force is applied upon the bumper cover in a vehicle longitudinal direction and transferred onto the fastening device, thereby causing the pivot member to swing about the pivot against the restraining member.

20 Claims, 3 Drawing Sheets

MOTOR VEHICLE AND FASTENING DEVICE FOR A MOTOR VEHICLE

CROSS-REFERENCES TO RELATED APPLICATIONS

This application claims the priority of German Patent Application, Serial No. 10 2016 010 356.6, filed Aug. 26, 2016, pursuant to 35 U.S.C. 119(a)-(d), the disclosure of which is incorporated herein by reference in its entirety as if fully set forth herein.

BACKGROUND OF THE INVENTION

The present invention relates to a motor vehicle and fastening device for a motor vehicle.

The following discussion of related art is provided to assist the reader in understanding the advantages of the invention, and is not to be construed as an admission that this related art is prior art to this invention.

Fastening devices can be used to secure a covering, e.g. lining, trim, panel etc., to a body of the motor vehicle. For example, a fastening device can be used to connect a bumper cover to the body of the motor vehicle by using an appropriate fastening structure to ensure that the bumper cover cannot detach from the body in the absence of an external impact and thus held captive on the body.

The fastening device can be connected to both the body, e.g. the longitudinal member or cross member or component thereof, and to the covering. The fastening device is typically only slightly deformable so that a person can find support, for example, upon a bumper cover, mounted to the vehicle rear by the fastening device, when loading or unloading a trunk, without causing deformation of the fastening device. However, in the event of a horizontal force impact, e.g. during a rear-impact crash, the vehicle body is likely to get damaged in the region of the rear bumper cover, since the force is conducted virtually undamped directly onto the vehicle body as a consequence of the merely slight deformation capability of the fastening device. Thus, damage resulting in substantial costs can incur already in the event of an impact at slight speed upon the bumper cover or when hitting an object or the like.

It would therefore be desirable and advantageous to address these problems and to obviate other prior art shortcomings.

SUMMARY OF THE INVENTION

According to one aspect of the present invention, a motor vehicle includes a vehicle body, a bumper cover, and a fastening device attaching the bumper cover to the vehicle body, the fastening device having a triangular shape and including a restraining member, a fastener configured to secure the restraining member to the vehicle body, a pivot member coupled to the bumper cover and having an end articulated to the restraining member via a pivot, and a support member angled in relation to the pivot member and supporting a pivot-distal end of the pivot member on the restraining member, the support member being configured to undergo a deformation, when a force is applied upon the bumper cover in a vehicle longitudinal direction and transferred onto the fastening device, thereby causing the pivot member to swing about the pivot against the restraining member.

In accordance with the present invention, the motor vehicle is thus equipped with a fastening device which has a movable mount of the pivot member to allow a pivotal movement that enables the pivot member to swing against the restraining member. As a result, a force impact upon the bumper cover in vehicle longitudinal direction, for example in the event of a rear-impact collision, can be compensated so as to prevent or at least minimize damage to the vehicle body in a crash situation. Costs incurred by the crash can be reduced because the crash causes damage merely to the fastening device and, possibly, to the bumper cover, that may need repair, whereas the vehicle body remains unharmed or is only slightly damaged. At the same time, the pivot enables a vertical support of the pivot member transversely to the vehicle longitudinal direction, thereby establishing a substantial vertical stiffness of the fastening device so that a person can rest on the bumper cover that is mounted by the fastening device to the vehicle body, without causing deformation of the fastening device.

The term "force impact in vehicle longitudinal direction" is used in the description in a generic sense and relates to any force impact with a horizontal force component which does not necessarily have to extend parallel to the vehicle longitudinal axis, but may also extend at an angle thereto. Thus, even when being hit by a vehicle at a slant, the bumper cover is movably guided relative to the vehicle body via the fastening device. In the event of a collision direction at an oblique angle to the vehicle longitudinal axis, there is still a force component in parallel relation to the vehicle longitudinal axis to act upon the bumper cover.

According to another advantageous feature of the present invention, the pivot can be an articulated joint or a hinge connection. In general, the articulated joint or a hinge connection may include a head and socket, with the hinge connection having an elongate head defining a hinge axis, and a channel-like socket in which the elongate head is rotatably mounted. The head may hereby be arranged on the restraining member and the socket may be arranged on the pivot member, or vice versa. It is also conceivable to form the pivot from several pivot sections arranged in regions between the restraining member and the pivot member. The pivot may also be configured as a film hinge having a flexible material which is arranged between the restraining member and the pivot member and secured to the restraining member and the pivot member.

According to another advantageous feature of the present invention, the support member can have a predetermined breaking point or can be supported on the retraining member via a predetermined breaking point, with the support member being deformable via the predetermined breaking point, when the predetermined breaking point ruptures. The predetermined breaking point may involve, for example, a reduction in the wall thickness and/or perforation of a wall of the restraining member. The reduction in the wall thickness can be implemented by notching a wall of the restraining member. The presence of the predetermined breaking point allows a targeted deformation of the fastening device when subjected to a force impact. Thus, through appropriate dimensioning, positioning, and orientation of the predetermined breaking point, the behavior of the fastening device can be influenced in the event of a force impact upon the bumper cover that is attached by the fastening device to the vehicle body. As a result, the fastening device does not undergo deformation, when exposed to a certain force, in particular a force impact from above, i.e. vertically to the vehicle longitudinal axis, for example when a user of the motor vehicle rests from above upon the bumper cover, while the force impact of same magnitude in vehicle longitudinal direction causes rupture of the predetermined breaking point and thus deformation of the support member which then separates from the restraining member and enables the pivot member to swing against the restraining member.

According to another advantageous feature of the present invention, the pivot member and the support member can be made in one piece, and/or the support member can be attached to the pivot member via a snap fit and/or locking connection and/or clamping connection, and/or the support member can include a connection element attached via a snap fit or locking connection or clamping connection. In the case of a single-piece configuration, the pivot member and the support member that is angled from the pivot member, can involve, for example, a molding which is made of plastic through an injection molding process. When the support member is connected to the pivot member via a snap fit and/or locking connection and/or clamping connection, both the support member and the pivot member can be joined in a form-fitting manner via a respective connection. When a snap fit is involved, the elasticity of material used for the pivot member and the support member in particular can be crucial as to how much force has to be applied to connect and separate these two members. In accordance with the invention, the force required to release the snap fit and/or locking connection and/or clamping connection may, for example, differ from the force required to rupture the predetermined breaking point. This can be realized by suitably dimensioning the predetermined breaking point, so that an incremental deformation of the fastening device can be realized in dependence on the force applied on the bumper cover. For example, there could be a scenario in which the force to rupture the predetermined breaking point and to overcome the snap fit for detaching the support member is greater than the force necessary to release only the snap fit of the fastening device. When the support member includes an additional connection element that is attached via a snap fit and/or locking connection and/or clamping connection, the arrangement of the connection element on the support member may be such as to connect to the support member with both its ends and thus being embedded therein. The predetermined breaking point may be directly arranged on the additional connection element. This is advantageous because in the event of a deformation of the fastening device including the support member, only the connection element may need to be replaced in order to restore functionality of the fastening device.

According to another advantageous feature of the present invention, the predetermined breaking point can be configured as a snap fit and/or locking connection and/or clamping connection, with the support member and the restraining member being detachably connected via a snap fit or locking connection or clamping connection. As a result, when the pivot member is formed, for example, in one piece with the support member, the support member can be secured to the restraining member by as a snap fit and/or locking connection and/or clamping connection. This snap fit and/or locking connection and/or clamping connection can deform, when a force, impacting the bumper cover in vehicle longitudinal direction and conducted onto the fastening device, such that the snap fit and/or locking connection and/or clamping connection is released so that the support member is then pushed through an opening arranged on the restraining member and, optionally, in the body or a structure to which the restraining member is mounted. As a result, the pivot member can also swing against the restraining member.

According to another advantageous feature of the present invention, the fastener to secure the restraining member on the vehicle body can be a screw fastener or bolt sized to traverse the restraining member for engagement in an opening of the vehicle body.

According to another advantageous feature of the present invention, the bumper cover can be connected to the fastening device by gluing and/or bolting and/or snap fit and/or locking connection and/or clamping connection and/or plug connection. For example, a threaded sleeve can be placed in the opening of the vehicle body for threaded engagement of the fastener in the form of a screw fastener. It is also possible within the scope of the invention, to form the opening in the vehicle body as a threaded bore in which the fastener in the form of a screw fastener is threadably engaged, with a locknut being additionally screwed onto the fastener from the fastening-device-opposite side of a structure to which the fastening device is attached. In case the fastener is a bolt, the bolt may be formed with an undercut for engagement of a clamping device fixed to the bolt, when the bolt traverses the opening of the vehicle body. Thus, the bolt and thus the overall fastening device are held in their mounting position.

According to another advantageous feature of the present invention, the restraining member and/or the pivot member can include stiffening ribs. The stiffening ribs may, for example, involve vertical ribs which are arranged in the mounting position of the fastening device transversely to the vehicle longitudinal axis. In addition, the stiffening ribs may be provided on the inside and/or outside. When providing inner stiffening ribs on both the restraining member and the pivot member, the stiffening ribs of the pivot member may be arranged in offset relation to the stiffening ribs of the restraining member. This prevents clashing stiffening ribs from restricting a swinging movement of the pivot member against the restraining member. In addition, the stiffening ribs may be formed in one piece with the pivot member or the restraining member, e.g. as single-piece injection-molded part. A force that impacts the bumper cover and conducted onto the fastening device can thus be effectively dispersed by the stiffening ribs across the entire area or at least across part of the area of the fastening device.

According to another advantageous feature of the present invention, the pivot can extend at least over part of the fastening device and can have recesses for engagement of the stiffening ribs, when the pivot member swings against the restraining member. When the stiffening ribs extend over the entire length of the restraining member, the presence of a number of recesses in correspondence to a number and position of the stiffening ribs in the region of the pivot can prevent that a swinging movement of the pivot member against the restraining member is restricted by the stiffening ribs.

According to another aspect of the present invention, a fastening device for attaching a bumper cover onto a motor vehicle has a triangular shape and includes a restraining member, a pivot member having an end articulated to the restraining member via a pivot, and a support member angled in relation to the pivot member and supporting a pivot-proximal end of the pivot member on the restraining member, the support member being configured to undergo a deformation, when subjected to a force impact, thereby causing the pivot member to swing about the pivot against the restraining member.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
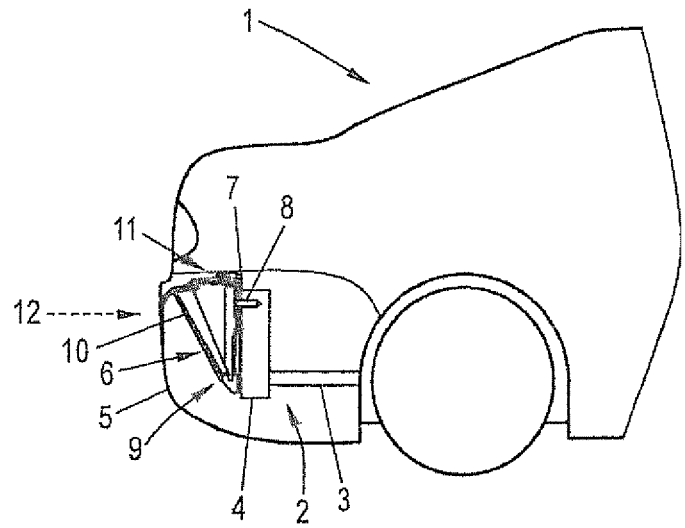
FIG. 1 is a side view of a basic illustration of an exemplary embodiment of a rear section of a motor vehicle according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a side view of a basic illustration of an exemplary embodiment of a rear section of a motor vehicle according to the present invention, generally designated by reference numeral 1. The motor vehicle 1 includes a vehicle body 2 which in travel direction has two longitudinal members, of which only the longitudinal member 3 on the right side is visible whereas the left longitudinal member lying behind the longitudinal member 3 is thus concealed. In addition, the vehicle body 2 includes a cross member 4 which is a BIW cross member, and a bumper cover 5 which is attached to the cross member 4. The bumper cover 5 is attached to the vehicle body 2 via a fastening device 6 arranged between the bumper cover 5 and the vehicle body 2 and connecting the bumper cover 2 and the vehicle body 2. The fastening device 6 includes a restraining member 7 which is secured by a fastener 8 in the form of a bolt to the cross member 4, a pivot member 10 articulated to the restraining member 7 via a pivot 9, and a support member 11 which extends at an angle from the pivot member 10 at a pivot-distal side of the pivot member 10 and is supported on the restraining member 7.

Figure 2:
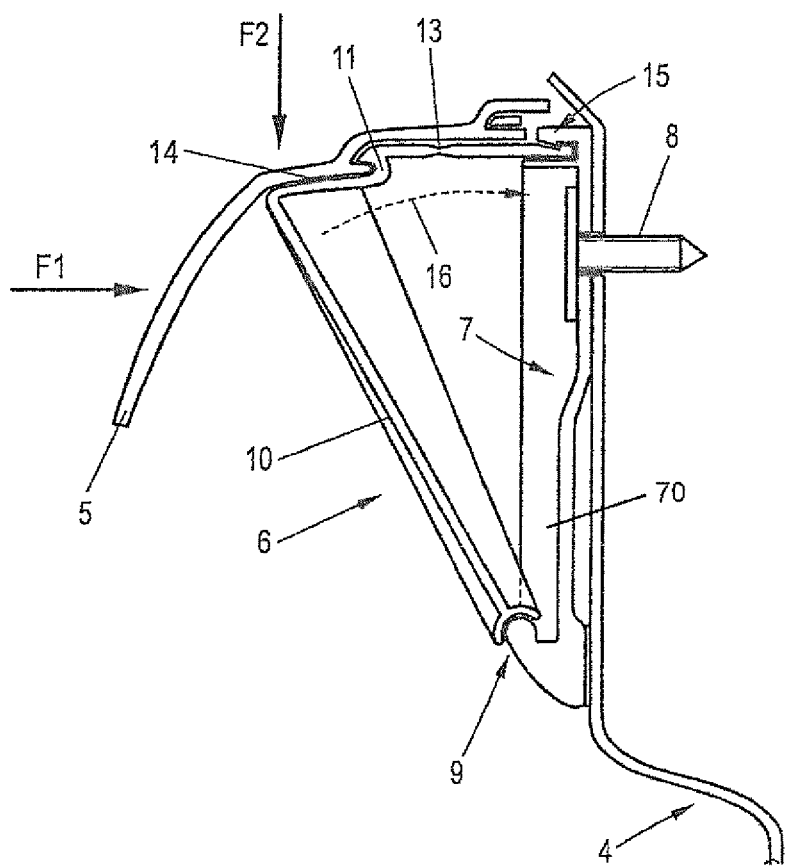
FIG. 2 is a side view of a detailed view of a first exemplary embodiment of a fastening device for use in the motor vehicle of FIG. 1.
Figure 7:
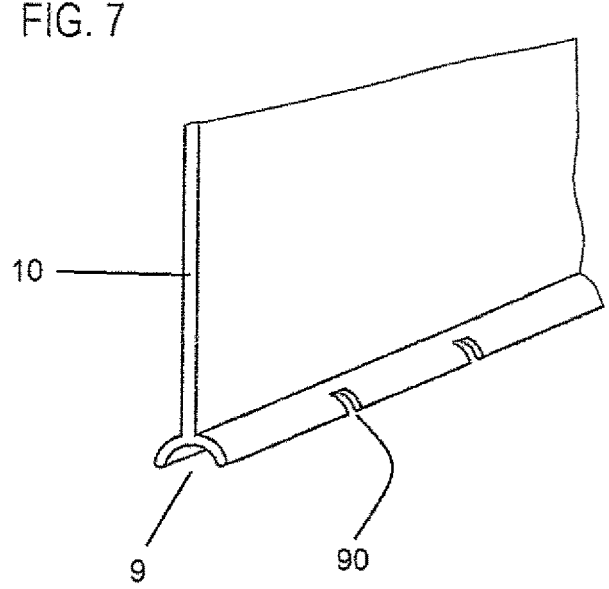
FIG. 7 is a perspective view of a pivot between the pivot member and a restraining member of a fastening device for use in the motor vehicle of FIG. 1.

As is readily apparent from FIG. 2, which is a side view of a detailed view of a first exemplary embodiment of the fastening device 6 for use in the motor vehicle 1, the support member 11 is provided with a predetermined breaking point 13 which, as shown, is realized by a reduction in the wall thickness of the support member 11. As further shown in FIG. 2, the restraining member 7 is provided with stiffening ribs 70. The pivot 9 extends at least over part of the fastening device 6 and has recesses 90 (FIG. 7) for engagement of the stiffening ribs 70, when the pivot member 10 swings against the restraining member 7.

In the event of a force impact in vehicle longitudinal direction as indicated by arrow 12, shown in dashed line, the force can be transferred from the bumper cover 5 onto the fastening device 6, causing the support member 11 of the fastening device 6 to rupture at the predetermined breaking point 13 and thereby undergo a deformation. As a result, the pivot member 10 is able to swing about the pivot 9 against the restraining member 7, as indicated by arrow 16, shown in dashed line. The force impacting the bumper cover 5 and further conducted through the fastening device 6 is virtually damped so that a force transfer from the fastening device 6 onto the cross member 4 and the vehicle body 2 is prevented or at least significantly minimized. The bumper cover 5 is thus moved together with the pivot member 10 in the direction of the restraining member 7, causing the bumper cover 5 to effectively yield and preventing the force to be transferred directly onto the vehicle body 2.

FIG. 2 clearly shows the fastening device 6 for securing the restraining member 7 by fastener 8 in the form of a bolt to the cross member 4, the pivot member 10 articulated to the restraining member 7 via the pivot 9, and the support member 11. As is further readily apparent from FIG. 2, the support member 11, on one hand, has a contact surface 14 which is glued to the bumper cover 5 and, on the other hand, is held captive on the restraining member 7 via a snap fit 15. As an alternative or in addition, the bumper cover 5 may be locked, welded, or connected by a form fit, or by any other suitable connection at the contact surface 14. The pivot member 10, which is formed by way of example in one piece with the support member 11, is thus unable to move away from the restraining member 7 by a pivotal movement about the pivot 9. Also the bumper cover 5 is prevented from detaching from the support member 11 through further fasteners, not shown in detail.

As soon as a force impacts the bumper cover 5 in the direction of arrow F1, e.g. in the event of a rear-impact collision, the force is transferred onto the fastening device 6, causing rupture of the predetermined breaking point 13 on the support member 11, when the force reaches a certain level that is defined by the dimension, position, and orientation of the predetermined breaking point 13. The pivot member 10 can then move in the direction of arrow 16 about the pivot 9 against the restraining member 7, so that the force, caused by the impact in the direction of arrow F1, is compensated at least in part and damage to the cross member 4, lying behind the fastening device 6, is prevented or at least significantly reduced.

In the event of a force impact in the direction of arrow F2, the fastening device 6 is supported via the pivot member 10, articulated via the pivot 9 to the restraining member 7, such that the predetermined breaking point 13 on the support member 11, in contrast to a force impact in the direction of arrow F1, is not effected or, if at all, only slightly effected, and thus does not rupture. As a result, the fastening device 6 is stiff enough in vertical direction to allow, for example, a user of the motor vehicle 1 to find support on the bumper cover 5 in the direction of arrow F2, without deformation of the fastening device 6 as a result of a rupture of the predetermined breaking point 13. In comparison to the vertical stiffness, the fastening device 6 has only a relatively small stiffness in horizontal direction as a consequence of the predetermined breaking point 13.

Figure 3:
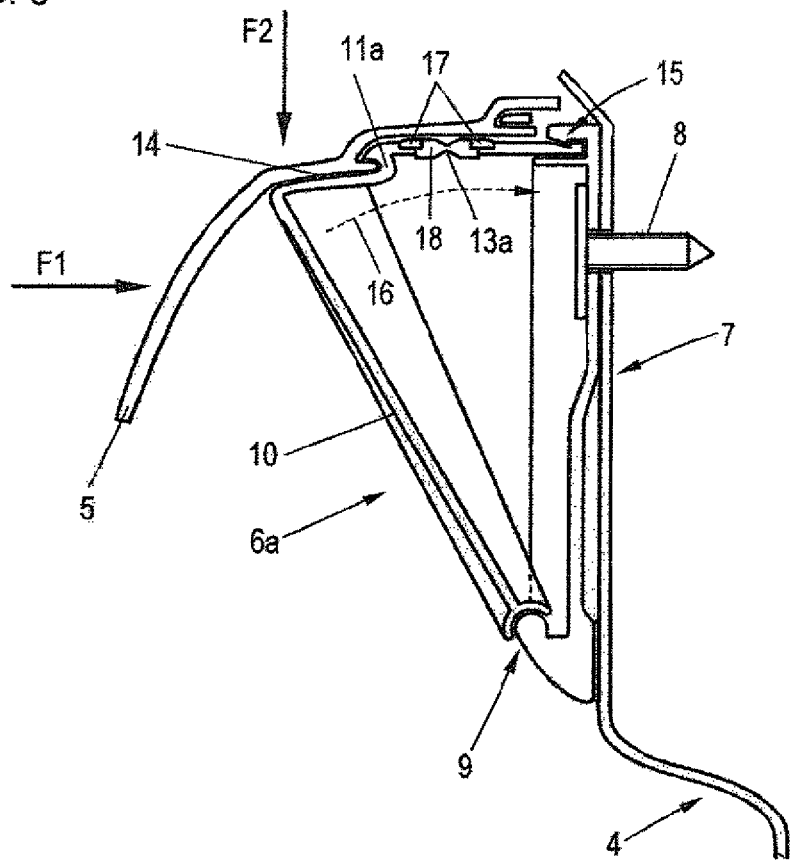
FIG. 3 is a side view of a detailed view of a second exemplary embodiment of a fastening device for use in the motor vehicle of FIG. 1.

FIG. 3 shows a side view of a detailed view of a second exemplary embodiment of a fastening device 6a for use in the motor vehicle 1. Parts corresponding with those in FIG. 2 are denoted by identical reference numerals and, where appropriate for the understanding of the invention, by corresponding reference numerals followed by an "a". Like the fastening device 6 of FIG. 2, the fastening device 6a includes the restraining member 7 which is secured via fastener 8 in the form of a bolt to the cross member 4, and the pivot member 10 articulated to the restraining member 7 via the pivot 9.

In the embodiment of FIG. 3, the fastening device 6a has a support member 11a which is supported on the bumper cover 5 via the contact surface 14 and held on the restraining member 7 via snap fit 15. In addition, provision is made for a connection element 18 which is attached to the support member 11a via two further snap fits 17. The connection element 18 has a predetermined breaking point 13a, which ruptures as soon as a specific force reaches a level which is defined by the dimension, position, and orientation of the predetermined breaking point 13a. When the predetermined breaking point 13a ruptures, the pivot member 10 is able to swing in the direction of arrow 16 about the pivot 9 against the restraining member 7. As a result, a force, caused for example by a rear-impact collision in the direction of arrow F1, can be compensated at least in part, so that damage to the cross member 4, lying behind the fastening device 6a, can be prevented at least in part.

The presence of an additional connection element 18 which is formed with a predetermined breaking point 13a has the advantage that following a deformation of the fastening device 6a, there may only be a need to replace the connection element 18 in order to restore functionality of the fastening device 6a.

Figure 4:
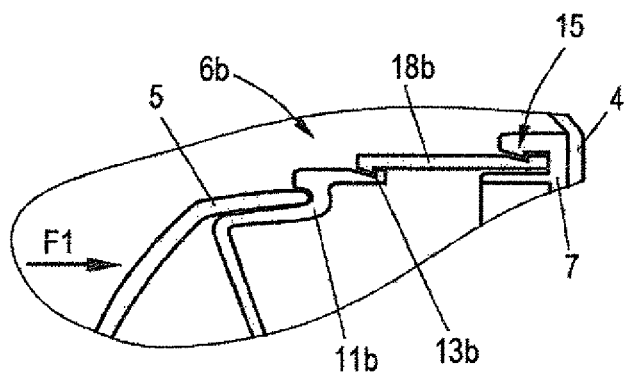
FIG. 4 is a side view of a detailed view of a third exemplary embodiment of a fastening device for use in the motor vehicle of FIG. 1.

FIG. 4 shows a side view of a detailed view of a third exemplary embodiment of a fastening device 6b for use in the motor vehicle 1. Parts corresponding with those in FIGS. 2 and 3 are denoted by identical reference numerals and, where appropriate for the understanding of the invention, by corresponding reference numerals followed by a "b". The description below will center on the differences between the embodiments. Provision is made for a support member 11b which like in the fastening devices 6, 6a is glued to the bumper cover 5. The restraining member 7 is secured to the cross member 4 and coupled to a connection element 18b via a snap fit 15. In the embodiment of the fastening device 6 of FIG. 4, a predetermined breaking point 13b is formed by a snap fit which is arranged on the connection element 18b and shaped to couple the connection element 18b with the support member 11b. In the presence of a force impact in the direction of arrow F1, the predetermined breaking point 13b in the form of the snap fit is released to enable the bumper cover 5 to move together with the support member 11b along the connection element 18b in the direction of the restraining member 7 to thereby compensate the force impact, at least in part, and to prevent damage to the cross member 4, lying behind the fastening device 6b, at least in part.

Figure 5:
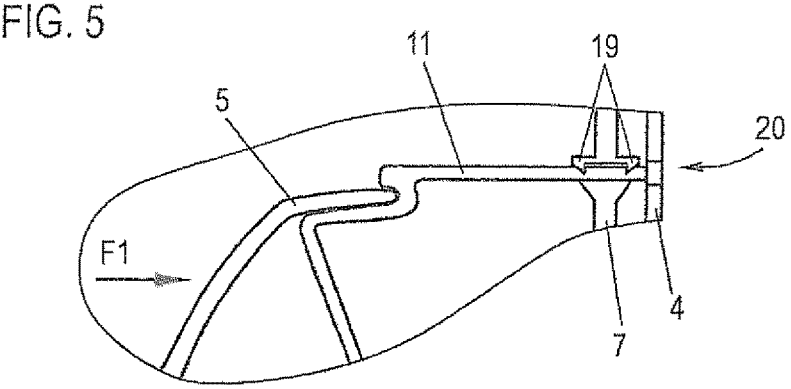
FIG. 5 is a side view of a detailed view of a fourth exemplary embodiment of a fastening device for use in the motor vehicle of FIG. 1.
Figure 6:
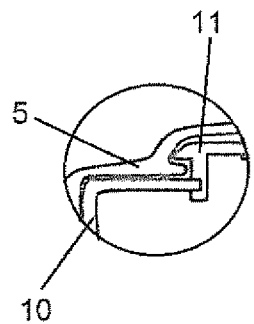
FIG. 6 is a cutaway view of a modified connection between a pivot member and a support member of a fastening device for use in the motor vehicle of FIG. 1.

FIG. 5 shows a side view of a detailed view of a fourth exemplary embodiment of a fastening device 6c for use in the motor vehicle 1. Parts corresponding with those in FIGS. 2 to 4 are denoted by identical reference numerals and, where appropriate for the understanding of the invention, by corresponding reference numerals followed by a "c". The description below will center on the differences between the embodiments. In this embodiment, provision is made for a support member 11c which is configured to traverse a restraining member 7c and coupled directly to the restraining member 7c via two snap fits 19. The snap fits 19 serve as predetermined breaking point and can be released when subjected to a force impact in the direction of arrow F1. An opening 20 in the cross member 4, lying behind the fastening device 6c, enables the support member 11c, after release of the snap fits 19, to move through the opening 20 so that the bumper cover 5, which is glued, locked, welded, connected by a form fit, or connected by any other suitable connection with the support member 11c, is able to move in the direction of the restraining member 7c. Thus, the force impact in the direction of arrow E1 can be compensated, at least in part, and damage to the cross member 4, lying behind the fastening device 6b, can be prevented at least in part.

Although not shown in detail, an additional structure may be attached, as an alternative, between the cross member 4 and the fastening device 6c, with the fastening device 6c being secured with the restraining member 7c to the additional structure. Thus, the opening 20, in which the support member 11c plunges in the presence of a force impact, may also be formed in the additional structure.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A motor vehicle, comprising:
   a vehicle body;
   a bumper cover; and
   a fastening device attaching the bumper cover to the vehicle body, said fastening device having a triangular shape and including a restraining member, a fastener configured to secure the restraining member to the vehicle body, a pivot member coupled to the bumper cover and having an end articulated to the restraining member via a pivot, and a support member angled in relation to the pivot member and supporting a pivot-distal end of the pivot member on the restraining member, said support member being configured to undergo a deformation, when a force is applied upon the bumper cover in a vehicle longitudinal direction and transferred onto the fastening device, thereby causing the pivot member to swing about the pivot against the restraining member.

2. The motor vehicle of claim 1, wherein the pivot is an articulated joint or a hinge connection.

3. The motor vehicle of claim 1, wherein the support member has a predetermined breaking point or is supported on the retraining member via a predetermined breaking point, with the support member being deformable via the predetermined breaking point, when the predetermined breaking point ruptures.

4. The motor vehicle of claim 1, wherein the pivot member and the support member are made in one piece.

5. The motor vehicle of claim 3, wherein the predetermined breaking point is configured as a snap fit or locking connection or clamping connection, with the support member and the restraining member being detachably connected via a snap fit or locking connection or clamping connection.

6. The motor vehicle of claim 1, wherein the fastener is a screw fastener or bolt sized to traverse the restraining member for engagement in an opening of the vehicle body.

7. The motor vehicle of claim 1, wherein the bumper cover is connected to the fastening device by at least one process selected from the group consisting of gluing, bolting, snap fit, locking connection, clamping connection, and plug connection.

8. The motor vehicle of claim 1, wherein at least one of the restraining member and pivot member includes stiffening ribs.

9. The motor vehicle of claim 8, wherein the pivot extends at least over part of the fastening device and has recesses for engagement of the stiffening ribs, when the pivot member swings against the restraining member.

10. A fastening device for attaching a bumper cover onto a motor vehicle, said fastening device having a triangular shape and comprising a restraining member, a pivot member having an end articulated to the restraining member via a pivot, and a support member angled in relation to the pivot member and supporting a pivot-distal end of the pivot member on the restraining member, said support member being configured to undergo a deformation, when subjected to a force impact, thereby causing the pivot member to swing about the pivot against the restraining member.

11. The fastening device of claim 10, wherein the pivot is an articulated joint or a hinge connection.

12. The fastening device of claim 10, wherein the support member has a predetermined breaking point or is supported on the restraining member via a predetermined breaking point, with the support member being deformable via the predetermined breaking point, when the predetermined breaking point ruptures.

13. The fastening device of claim 10, wherein the pivot member and the support member are made in one piece.

14. The fastening device of claim 12, wherein the predetermined breaking point is configured as a snap fit or locking connection or clamping connection, with the support member and the restraining member being detachably connected via a snap fit or locking connection or clamping connection.

15. The fastening device of claim 10, wherein at least one of the restraining member and pivot member includes stiffening ribs.

16. The fastening device of claim 15, wherein the pivot extends at least over part of the fastening device and has recesses for engagement of the stiffening ribs, when the pivot member swings against the restraining member.

17. The motor vehicle of claim 1, wherein the support member is attached to the pivot member via a snap fit or locking connection or clamping connection.

18. The motor vehicle of claim 1, wherein the support member includes a connection element attached via a snap fit or locking connection or clamping connection.

19. The fastening device of claim 10, wherein the support member is attached to the pivot member via a snap fit or locking connection or clamping connection.

20. The fastening device of claim 10, wherein the support member includes a connection element attached via a snap fit or locking connection or clamping connection.

* * * * *